March 31, 1953 M. DINSMORE ET AL 2,633,264
SPACED WALL INSULATED CONTAINER
Filed April 5, 1951

INVENTOR
MARGARET DINSMORE
ERIC K. LOTTHAMMER
BY
L. S. Saulsbury
ATTORNEY

Patented Mar. 31, 1953

2,633,264

UNITED STATES PATENT OFFICE 2,633,264

SPACED WALL INSULATED CONTAINER

Margaret Dinsmore, Summit, N. J., and Eric K. Lotthammer, Jamaica, N. Y.; said Lotthammer assignor to said Dinsmore Application April 5, 1951, Serial No. 219,501

2 Claims. (Cl. 220—15)

This invention relates to a thermos unit, particularly suitable for use in carrying hot foods in lunch boxes.

One object of this invention is to provide a simple thermos unit for carrying a quantity of warm foods in a standard lunch box, or for carrying several separate foods in a single thermos container.

Another object of the invention is to provide a thermos unit of simple construction and of such form and dimensions as to fit readily in a standard sized lunch box.

Another object of the invention is to provide a thermos unit of simple construction and design that is simple and economical to manufacture, and that may be easily assembled and cleaned for successive uses.

The construction of the thermos unit in accordance with the present invention is illustrated in the accompanying drawing, in which.

Figure 1:
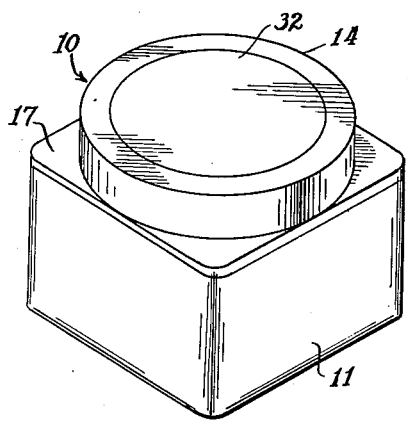
Fig. 1 is a diagonal perspective view of a closed thermos unit.

As shown in the drawing, a thermos unit 10 comprises a base 11, a cup or container 12 for receiving the food, an anti-spilling cover 13 and a closure cap or lid 14.

The base 11 consists of two nested spaced shells 15 and 16, preferably of plastic material, the upper edges of which are cemented and sealed to a spacer and sealing ring 17. The space between the outer shell and the inner shell 16 may be evacuated, or it may be left as a dead air space, or it may be filled with insulating material. The inner shell 16 is supported, however, above the outer shell 15, so that the entire outer surface of the inner shell 16 is protected by the insulating medium.

The top sealing ring 17 for the shell serves to space the shell walls properly and to connect the upper edges of the two shell bodies rigidly together. The spacing ring 17 thus serves also as a support for the inner shell 16.

Figure 4:
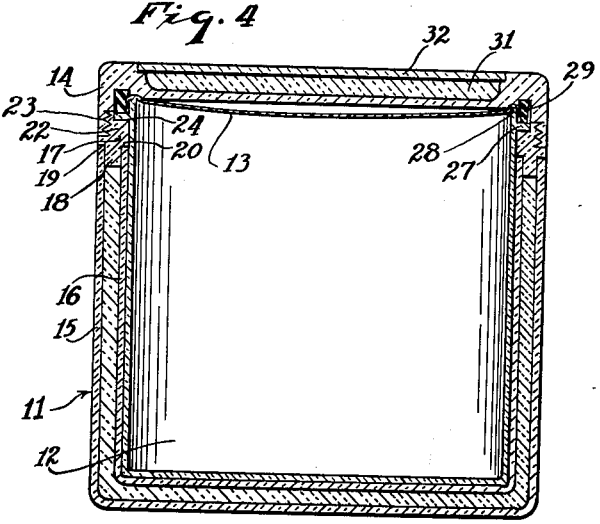
Fig. 4 is a vertical sectional view enlarged of the thermos unit taken along the line 4—4 in Fig. 2.
Figure 2:
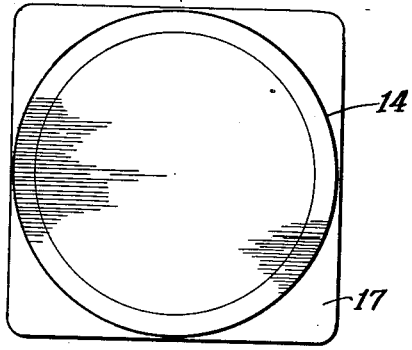
Fig. 2 is a plan view of the thermos unit shown in Fig. 1.
Figure 5:
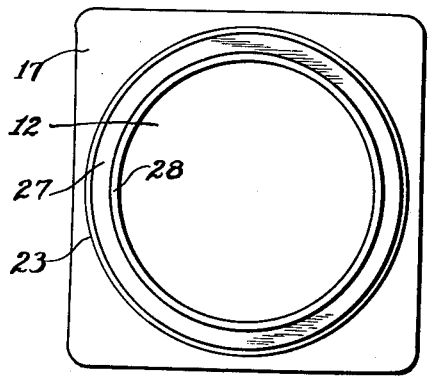
Fig. 5 is a top view of the thermos unit with the cover removed.
Figure 3:
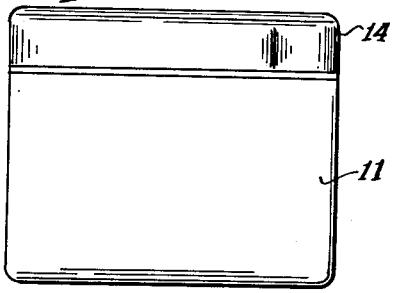
Fig. 3 is a side elevational view of the thermos unit shown in Fig. 2.

The spacing ring 17, as shown in Fig. 4, comprises the lower annular spacing element 18, the two shoulder portions 19 and 20 that rest respectively on the top edges of the outer and inner shells 15 and 16, and an upper circular section 22 that is threaded on its external surface 23 and is provided with a shoulder 24 on its inner surface.

The sealing and spacing ring 17 thus consists of a relatively flat plate section, as viewed in Fig. 1, which seats on the top edges of the two nested shells 15 and 16, and consists further of a circular ring on top of a flat plate section, to provide the threaded cylindrical portion by means of which a closing cap, such as the closing cap 14, is applied to close the thermos container.

The receptacle 12, for the food itself, is of cup shape, to fit into the inner shell 16 and is provided with a supporting flange 27, shaped as an annular ring to seat and rest on the shoulders 24 on the opposite sides of the circular shoulder 24 on the inside of the circular portion of the sealing and spacing ring 17.

Figure 6:
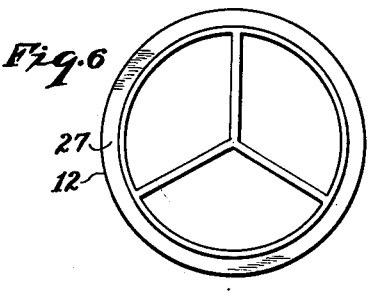
Fig. 6 is a plan view of the cup shaped receptacle, shown in the case as being provided with three compartments in order to receive and keep separate three different kinds of foods.

The food receptacle or cup 12 may be a simple cup with a single compartment, as shown in Fig. 4, or it may be provided with several compartments, as shown in Fig. 6. In either case, the cup is provided with the external flange 27 by means of which it is supported on the sealing ring 17, and is further provided with a smooth top edge 28 at the top of the cup to receive a thin, plastic vinyl cover 13 which is then pressed down by the cap 14 to seal the container or cup 12 to prevent any spilling therefrom.

As shown in Fig. 4, the flange 27 that encircles the cup 12 also serves as a seat for a sealing ring 29 which the cap 14 presses on when the cap 14 is threaded on to the spacing and sealing ring 17.

The heat from any warm food within the cup container 17 would tend to rise, and therefore it is desirable to provide heat insulation at the top of the cap 14. The cap 14 is, therefore, provided with an additional space 31 and a cover plate 32. The space 31 may be filled with insulation, as indicated, or it may be filled with a dead air space, where the dead air space would have a smaller heat conductivity than a solid section of the plastic material from which the cap 14 might be constructed.

The invention is not limited to the specific details and construction that are illustrated, since modifications might be made therein within the spirit and scope of the invention, as set forth in the appended claims.

We claim:

1. A thermos unit comprising a body consisting of two nested shells spaced with a heat insulating medium in the space between them and having their edges in co-planar alignment; a closure ring resting on said edges and secured thereto to close and seal the space between the two shells, said ring further embodying a seating shoulder and an external threaded cylindrical portion; a cup-shaped food receptacle embodying an external flange adapted to seat on the seating shoulder to support the receptacle, and further embodying a top portion extending above the flange; a resilient rubber-like sheet to cover and extend over the top edge of the top portion of the receptacle; and a closure cap having a threaded cylindrical apron to thread onto the threaded portion of the closure ring and to tighten down on the cover sheet to prevent spilling of the food from its receptacle, the under sides of the cap also carrying a sealing ring to press down on the flange of the receptacle and hold the flange and the container fixed.

2. A thermos unit comprising a body consisting of two nested spaced shells, one inner and one outer, an insulating medium disposed in the space between said shells, the edges of said shells being in co-planar alignment, a locking ring having shoulders resting on said co-planar edges and secured thereto to close and seal the space between the two shells, said ring further embodying an internal seating shoulder and an external threaded cylindrical portion extending above said seating shoulder and spaced inwardly from the outer surface of the outer shell to provide an external shoulder, a cup removably fitting into the inner shell and having external flange means spaced below its upper edge resting on the internal seating shoulder whereby to support the cup, and a closure cap having an internal threaded cylindrical apron to thread onto the external threaded portion of the locking ring and abut the external shoulder, said cap including a resilient compressible annular ring positioned to seat on said flange and pressing the flange downwardly whereby to hold the flange and the cup in fixed position and said cup having a substantially continuous upper edge supporting an anti-spill diaphragm cover element for said cup beneath said closure cap.

MARGARET DINSMORE.
ERIC K. LOTTHAMMER.

REFERENCES CITED

The following references are of record in the file of this patent:

UNITED STATES PATENTS

| Number | Name | Date |
|---|---|---|
| 1,096,572 | Stoffel | May 12, 1914 |
| 1,119,968 | LeSieur | Dec. 8, 1914 |
| 1,234,189 | MacMillan | July 24, 1917 |
| 1,527,349 | Curley | Feb. 24, 1925 |
| 1,549,618 | Skoda | Aug. 11, 1925 |
| 1,653,978 | Ballreich | Dec. 27, 1927 |
| 1,749,337 | Geyer | Mar. 4, 1930 |
| 2,326,414 | Thompson | Aug. 10, 1943 |